May 28, 1929.                M. W. ERDMANN                1,715,064
                        PLANT FOR MANUFACTURING WATER GAS
                    Filed Aug. 30, 1924          3 Sheets-Sheet 1
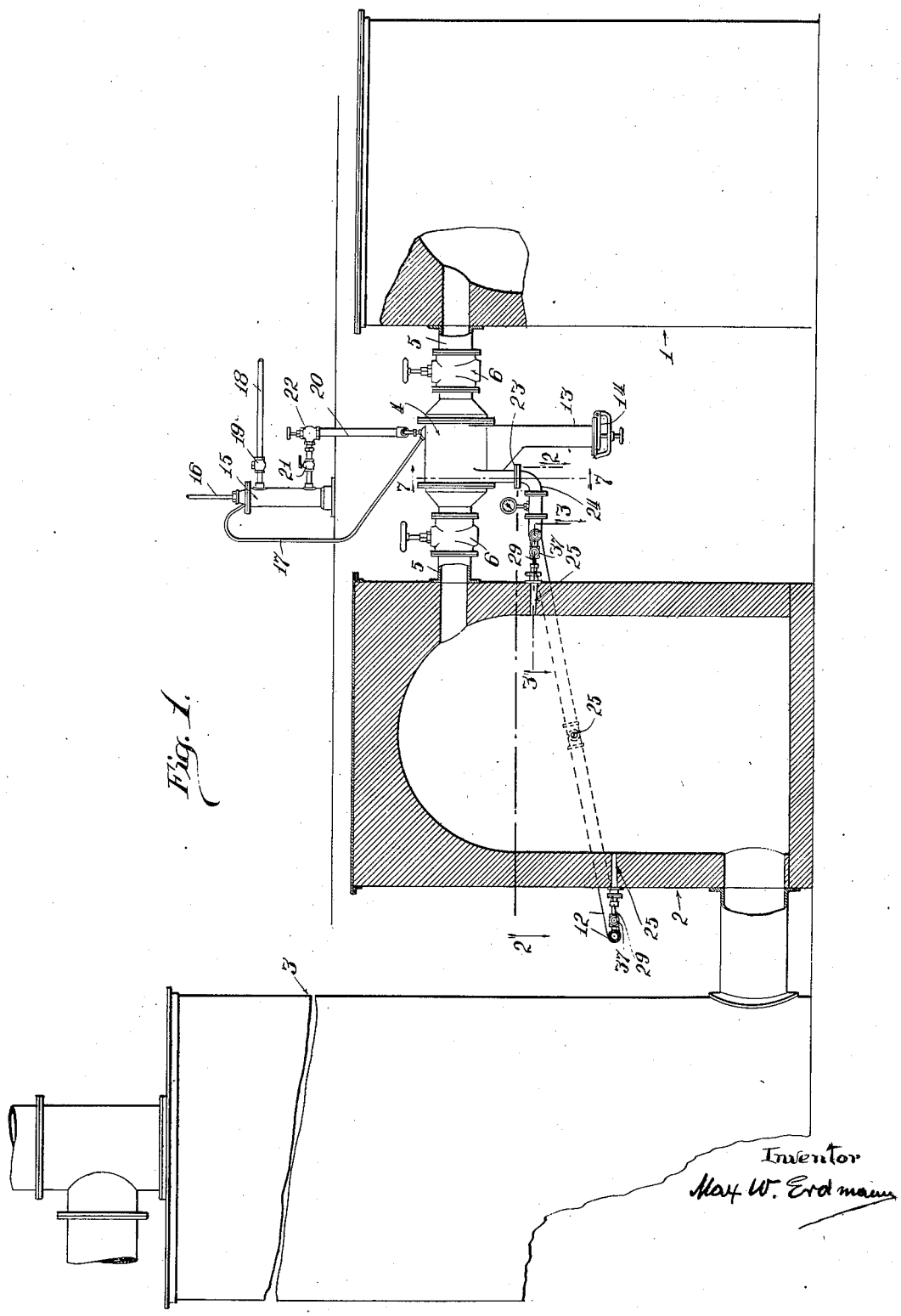

May 28, 1929. M. W. ERDMANN 1,715,064
PLANT FOR MANUFACTURING WATER GAS
Filed Aug. 30, 1924 3 Sheets-Sheet 2
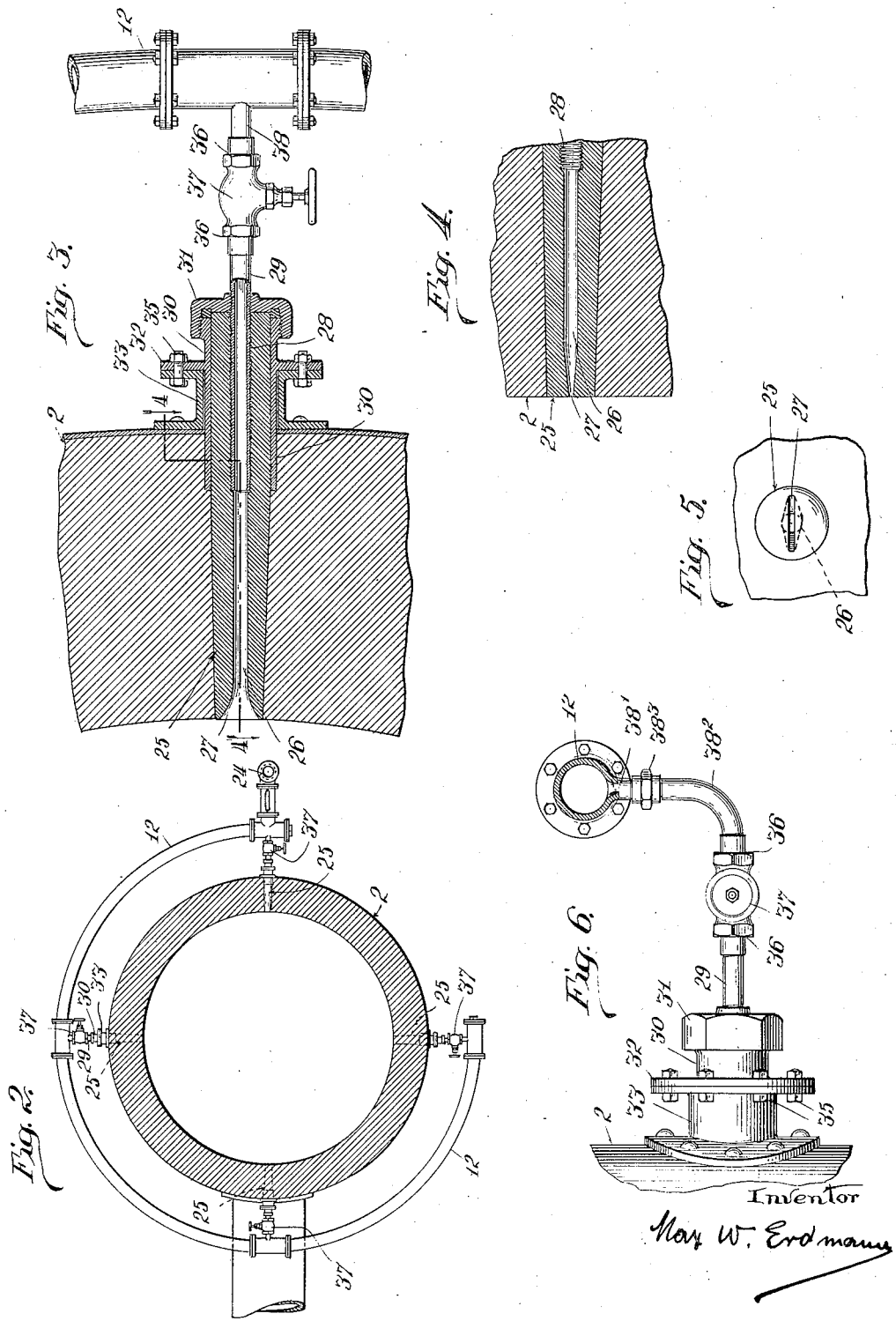
Inventor
Max W. Erdmann

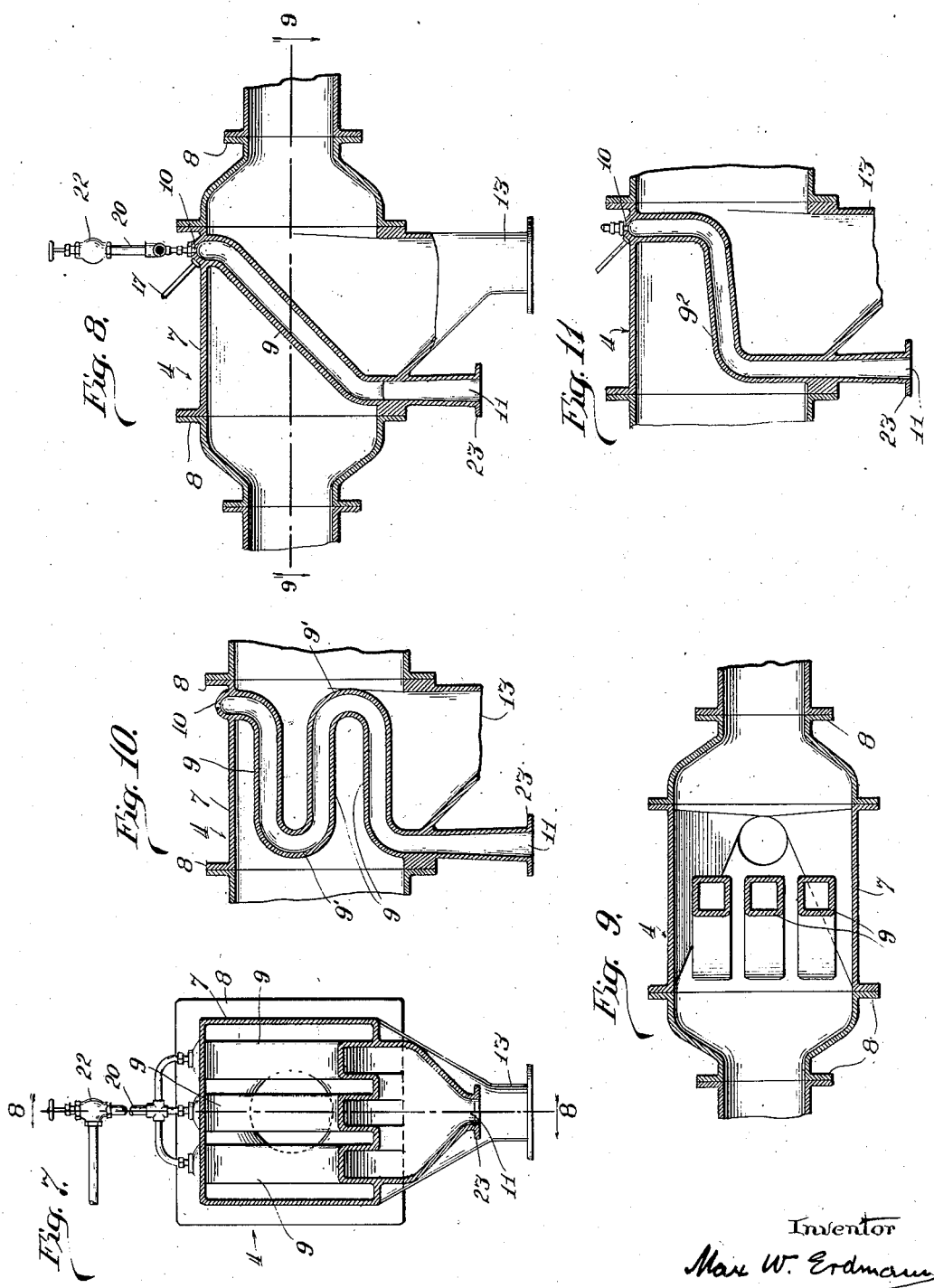

Patented May 28, 1929.

1,715,064

UNITED STATES PATENT OFFICE.

MAX W. ERDMANN, OF CHICAGO, ILLINOIS.

PLANT FOR MANUFACTURING WATER GAS.

Application filed August 30, 1924. Serial No. 735,211.

This invention relates to plants for the manufacturing of watergas. More particularly it relates to improvements in the apparatus for and the method of carburation of watergas in gas plants and the like.

The usual way of carburating watergas by means of oil consists in introducing oil directly into the watergas, when this gas enters from the generator into the carbureter. The oil is injected directly into the carbureter and causes thereby great losses of heat units of the oil, and this in turn causes higher manufacturing cost because more oil has to be used to produce gas of the necessary grade, that means gas giving off the intended heat units. In order to mix this oil thoroughly with the watergas it was necessary to build checkerbricks into the carbureter, and these bricks burn a great portion of the oil without giving off the carbon combinations of this oil to the watergas, so that as stated above a great part of the heat units of the oil is lost.

The object of the present invention is to eliminate this waste of heat units and thereby also to reduce the amount of oil used to produce watergas of a desired grade.

A further object of the invention is to produce an apparatus to vaporize the oil before it is injected into the watergas for carburetion.

A still further object of the invention is to utilize the heat of the generated watergas to be carbureted to vaporize the oil before it is injected into the watergas. To this end the invention provides a heating apparatus in which the oil is changed into oil vapor of 300 to 450 degrees Fahrenheit according to the kind and grade of oil used, the watergas traveling from the generator to the carbureter being utilized for heating purposes, without coming into direct contact with the oil.

The invention furthermore provides a plurality of spray nozzles, through which the vaporized oil is injected into the carbureter. These nozzles are arranged on the outer periphery of the carbureter and are preferably disposed spirally about the same.

In the drawings an embodiment of the preferred apapratus is shown like index numerals designating like parts in the different figures of the drawings, in which Fig. 1 is an elevation, partly in section, of a generator, a carbureter and a superheater of a gas plant, wherein the vaporizing apparatus is interposed between the generator and the carbureter and the nozzles are shown on the carbureter, Fig. 2 is a sectional view taken on line 2—2 of Fig. 1, Fig. 3 is a sectional view taken on line 3—3 of Fig. 1, Fig. 4 is a sectional view taken on line 4—4 of Fig. 3, Fig. 5 is an inner end view of one of the spray nozzles, Fig. 6 is a top view showing a modified from of connection between the main pipe for the oil vapor and the nozzle, Fig. 7 is a sectional view taken on line 7—7 of Fig. 1, Fig. 8 is a sectional view taken on line 8—8 of Fig. 7, Fig. 9 is a sectional view taken on line 9—9 of Fig. 8, Figs. 10 and 11 are vertical section views showing modifications of the pipe leading the oil through the heater.

In the drawings 1 is the watergas generator, 2 the carbureter and 3 the superheater. The watergas is conducted through these three devices and goes from the superheater to the so called "scrubber" or "washer", which is not shown.

The oil vaporizer 4 is interposed between the generator and the carbureter and is connected with the two by means of the pipes 5—5, and the valves 6—6 provided in these pipes serve to regulate the flow of the watergas and to interrupt the flow entirely if so desired.

In Figures 7, 8 and 9 the oil vaporizer 4 is shown in detail. It consists of a casing 7, preferably made of cast iron, and has flanges 8—8 for connecting it to the pipes 5 through the valves 6. The casing 7 contains heating chambers 9, 9, 9. These may be cast integrally with the casing or may be formed by pipes, preferably steel pipes, inserted in the casing. The heating chambers may either extend diagonally through the casing as shown in Figures 7, 8 and 9, or may be formed in a zigzag path as shown by 9' in Fig. 10, or may be bent as shown by $9^2$ in Fig. 11. The chambers 9, 9', $9^2$ have an opening 10 at their end to admit the oil and an exit opening 11 at their lower end, through which the oil vapor passes into a pipe 12 leading to the carbureter.

The chambers 9, 9', $9^2$ are heated by the hot watergas coming from the generator and flowing through the pipes 5, valves 6 and casing 7 into the carbureter. The inside dimensions of the vaporizer are such that the chambers 9, 9', 9² do not diminish the passage space for the flowing watergas. The vaporizer casing has at its lower end an extension 13 for the purpose of collecting ashes, dust and the like. The lower end of this extension is open and a suitable removable closure 14 for this opening is provided, so that the accumulated ashes and so forth can be removed when so desired.

Above the vaporizer 4 a cylinder 15 is provided, in which a piston with the piston rod 16 is reciprocated by any suitable means (not shown). A pressure equalizing pipe 17 leads from the vaporizer to the top of the cylinder 15. This arrangement prevents not only that the oil flow will be hindered, but also that the oil is pressed back against the piston. By means of the pipe 17 opening above the piston the pressure in the cylinder 15 above and below said piston is equalized. A pipe 18 connects the upper part of cylinder 15 with a source of oil (not shown) and the oil may be fed through said pipe in any desired manner. A valve 19 is provided in the pipe 18 adjacent the cylinder 15. The lower part of the cylinder has communication with the heating chambers 9 of the vaporizer 7 by means of a pipe line 20 discharging into the opening 10 in the top portion of the heating chambers. Adjacent the cylinder 15 a valve 21 is provided in the pipe line 20 and a control valve 22 is also arranged in the pipe line 20. The heating chambers 9 are provided at their lower ends with flanges 23 for connection with a pipe line 24 leading to main vapor pipe 12.

The vapor pipe is arranged in such a manner that it surrounds the carbureter and is preferably bent helically.

The vapor sprays communicate with the main vapor pipe. Each vapor spray consists of a cylindrical part 25, the discharge end whereof is conically shaped. This part is made from heat resisting material and penetrates the wall of the carbureter. In Fig. 2 four such sprays are shown, but, if desired, more or less sprays may be provided. It is however preferred to arrange said sprays in equal distances about the circumference of the carbureter. The spray has a centrally located bore 26. This bore is round along the greater part of its length, but the portion adjacent the discharge end is flattened, so that the discharge opening appears as a slot 27 as shown in Fig. 5. This slot lies preferably horizontally or in the plane of the spiral formed by the vapor pipe 12. The outer end of the bore 26 is provided with a thread 28 to receive a pipe 29. The vapor spray is located in a sleeve 30 and is secured in the same by means of a flange nut 31. The sleeve has a flange 32. A flanged pipe 33 is riveted to the carbureter and the flange 32 of the sleeve is fastened to the outer flange of pipe 33 by means of bolts 35 or the like. The outer end of the pipe 29 is connected to the main pipe 12 by means of the unions 36, the valve 37, and the short pipe 38, which is brazed or otherwise fastened to the vapor pipe 12.

In Fig. 6 a modification is shown of the manner of connecting the main vapor pipe with the spray. All the connecting parts are the same with the exception, that the short pipe 38' extends vertically from the vapor pipe and is connected with an elbow shaped pipe 38² by means of union 38³. The other end of the elbow is connected with one of the unions 36. This construction makes it possible, to remove the vapor spray 25, the sleeve 30, the conductor pipe 29, the unions 36 and the valve 37 as one unit in case it should be desired to repair or clean these parts. The removal of the unit can be effected by simply loosening the union 38³ and the bolts 35. The unit can then be drawn out of the carbureter, because the main vapor pipe 12 is located above the vapor spray.

The device operates as follows:

When the fuel in the water gas generator is air blasted, the blast gases flow through the oil vaporizer 4, the carbureter 2 to the superheater 3, and from there into the smoke stack. These hot gases preheat the vaporizer 4. Then steam is blown into the generator to create watergas and at the same time the valve 19 is closed and the valve 21 is opened. Preferably these valves are actuated automatically. The valve 22 is adjustable by hand to regulate the flow of the oil. The oil enters the heating chambers 9 of the vaporizer 4 and is vaporized. Thereby a pressure is created similar to the pressure in a steam boiler and this pressure forces the oil vapor into the main pipe 12, helically disposed about the carbureter. From there the vapor is pressed through the sprays 25 into the carbureter. Owing to the spiral formation of the main vapor pipe 12, the vapor sprays enter the carbureter in different superimposed planes so that the oil vapor injected into the carbureter will be disposed in several superimposed layers. The watergas entering the carbureter from the generator and flowing through the carbureter into the superheater must transverse these layers of oil vapor, so that a very intimate and thorough mixture of watergas and oil vapor will result. This mixture enters then the superheater, where a further vaporizing and fixing of the oil occurs, so that the oil vapor will enrich the watergas. The valve 37 is used to regulate the flow of oil vapor into the spray, so that the desired amount of oil vapor will enter into the carbureter.

Having described my invention and explained the objects thereof, I declare that what I claim and desire to secure by Letters Patent is:

1. A plant for manufacturing watergas, comprising a water gas generator, a carburetor and means for introducing oil vapors directly into the carburetor, said means comprising flat flaring nozzles disposed helically about the circumference of the carburetor, said nozzles injecting said vapors into said carburetor in substantially fan-like streams from a plurality of different directions.

2. A plant for manufacturing watergas, comprising a water gas generator, a carburetor, a passage leading from said generator to said carburetor, said passage having an enlargment therein, a source of oil, an oil vaporizing conduit connected with said source and extending transversely through the enlargement in said passage heated by the gases passing from said generator through said passage, and means for introducing the oil vapors from said vaporizing conduit into said carburetor at circumferentially and longitudinally spaced points along said carburetor whereby a substantially uniform intermixture of the water gas and oil vapor is obtained.

3. In a plant for manufacturing watergas, a vaporizer comprising a chamber into which heated water gas is introduced, an oil vaporizing chamber therein, a cylinder containing oil and communicating with said vaporizing chamber and a piston adapted to reciprocate in said cylinder to force oil into the vaporizing chamber.

4. In a plant for manufacturing watergas, a vaporizer comprising a chamber into which heated water gas is introduced, an oil vaporizing chamber therein, a cylinder containing oil and communicating with said vaporizing chamber, a piston adapted to reciprocate in said cylinder to force oil into the vaporizing chamber and an equalizing pipe leading from the heating chamber to the cylinder above the piston.

5. In a plant for manufacturing watergas, a vaporizer comprising a chamber into which heated water gas is introduced, an oil vaporizing chamber therein, a cylinder containing oil and communicating with said vaporizing chamber, means for automatically interrupting such communication, a piston adapted to reciprocate in said cylinder, and means for regulating the amount of oil forced into the vaporizing chamber by the piston.

In witness whereof I have attached hereunto my signature.

MAX W. ERDMANN.